(12) United States Patent
Chabanas et al.

(10) Patent No.: US 6,712,578 B2
(45) Date of Patent: Mar. 30, 2004

(54) LOADHANDLING EQUIPMENT, A VEHICLE INCORPORATING THE EQUIPMENT AND A METHOD OF RAISING A LOAD WITH THE EQUIPMENT

(75) Inventors: Noël Chabanas, Le Chambon Feugerolles (FR); Thierry Goiran, Bonson (FR)

(73) Assignee: Marrel, Andrezieux-Boutheon (FR)

( * ) Notice: Subject to any disclaimer, the term of this patent is extended or adjusted under 35 U.S.C. 154(b) by 49 days.

(21) Appl. No.: 10/101,442

(22) Filed: Mar. 20, 2002

(65) Prior Publication Data

US 2002/0146310 A1 Oct. 10, 2002

(30) Foreign Application Priority Data

Mar. 21, 2001 (FR) ............................................ 01 03819

(51) Int. Cl.[7] ................ B60P 1/48; B60P 1/28
(52) U.S. Cl. .............. 414/491; 414/498; 414/546; 414/812
(58) Field of Search .................. 414/498, 491, 414/546, 812

(56) References Cited

U.S. PATENT DOCUMENTS

| | | | |
|---|---|---|---|
| 3,825,137 A | | 7/1974 | Mackrill et al. |
| 3,878,948 A | | 4/1975 | Corompt |
| 5,082,417 A | | 1/1992 | Vlaanderen |
| 5,531,559 A | * | 7/1996 | Kruzick ...................... 414/498 |
| 5,542,808 A | * | 8/1996 | Chiron et al. ............... 414/498 |
| 5,597,281 A | * | 1/1997 | Croiset et al. .............. 414/498 |
| 5,601,393 A | * | 2/1997 | Waldschmitt ............... 414/498 |
| 6,558,104 B1 | * | 5/2003 | Vlaanderen et al. ........ 414/498 |

FOREIGN PATENT DOCUMENTS

| | | |
|---|---|---|
| DE | 7718760 | 10/1977 |
| FR | 2109109 | 5/1972 |
| FR | 2169810 | 12/1972 |
| FR | 2333666 | 7/1977 |
| FR | 2390361 | 12/1978 |
| GB | 1327928 | 8/1973 |
| GB | 2129402 A | 5/1984 |

* cited by examiner

*Primary Examiner*—Dean J. Kramer
(74) *Attorney, Agent, or Firm*—Crowell & Moring LLP

(57) ABSTRACT

Loadhandling equipment enables a vehicle to put down on the ground or pick up a load such as a dumpster and to tip the load, which has a lifting bar on a front face. The equipment includes a deformable and tilting handling arm which can assume, in addition to a transport position and a putting down on the ground or picking up position, a tipping position to which a hook adapted to interengage with the lifting bar is pivoted by a tilting actuator about a transverse pivot axis at the rear end of the equipment. The articulation about the transverse pivot axis is releasable and an actuator is provided to raise a link which is part of the handling arm by pivoting it upward and forward. The equipment can stand on its end a load which is at a greater height when standing on end than when it is positioned on the equipment.

20 Claims, 11 Drawing Sheets

LOADHANDLING EQUIPMENT, A VEHICLE INCORPORATING THE EQUIPMENT AND A METHOD OF RAISING A LOAD WITH THE EQUIPMENT

This application claims the priority of French Patent Document No. 0103819, filed Mar. 21, 2001, the disclosure of which is expressly incorporated by reference herein.

BACKGROUND OF THE INVENTION

1. Field of the Invention

The invention relates to equipment enabling a vehicle to manipulate a load such as a dumpster provided with a lifting bar on its front face.

2. Description of the Prior Art

Loadhandling equipment that includes a deformable and tilting handling arm provided at one end with a hook adapted to be interengaged with the lifting bar on the load is known in the art, in particular from patent application FR 2 109 109 A. In a transport position, the handling arm has a front section disposed at the front end of the equipment and oriented vertically or substantially vertically with the hook at the top and a longitudinal section oriented horizontally or substantially horizontally with a first end connected to the base of the front section and a second end adapted to be articulated to the rear of the vehicle about a transverse pivot axis. The longitudinal section is formed by a link having a first end articulated about the transverse rear pivot axis and by a first branch of an angle-bracket, whose second branch forms the front section. The first branch of the angle-bracket has its end opposite the front section articulated to the second end of the link about a transverse intermediate pivot axis. The first branch of the angle-bracket is telescopic and has a deployed position in which its length is a maximum and a retracted position in which its length is a minimum. The first branch is deployed in the transport position mentioned above. In addition to this position, the handling arm can assume:

- a putting down on the ground or picking up position, in which the hook is to the rear of the vehicle at a height enabling it to be interengaged with or released from the lifting bar of a load of the type mentioned above, resting on the ground, the movement between the transport position and the putting down on the ground or picking up position being effected initially by the movement of the first branch of the angle-bracket from its deployed position to its retracted position, followed by pivoting of the angle-bracket by a tilting actuator about its articulation with the link, the latter remaining fixed; and
- a tipping position, to which the hook moves from the transport position by being pivoted upwardly and rearwardly about the transverse rear pivot axis by the tilting actuator, the arm retaining during this pivoting movement the same configuration as in the transport position.

Also known in the art are variants of the arrangement of the longitudinal section of the arm and the manner in which it is deformed between the transport position and the putting down on the ground or picking up position, in particular as disclosed in U.S. Pat. No. 3,878,948, in which the angle-bracket pivots relative to the link until it reaches a predetermined angle, from which it is abutted against the link, these two members then pivoting together about the transverse rear pivot axis, or as disclosed in patent application FR 2 169 810 A, in which the telescopic first branch of the angle-bracket is replaced by a front end portion of the first branch that can be raised to retract the hook. Some equipment combines an angle-bracket and a link operating as described in U.S. Pat. No. 3,878,948 with an angle-bracket whose first branch is telescopic and/or has an end portion that can be raised, respectively as described in the document FR 2 109 109 A and in the document FR 2 169 810 A.

The invention aims to increase the possibilities of using this kind of equipment without compromising its simple and economic character.

SUMMARY OF THE INVENTION

To this end it proposes equipment enabling a vehicle to put down on the ground or to pick up a load such as a dumpster and to tip the load, which has a lifting bar on a front face, the equipment including a deformable and tilting handling arm provided at one end with a hook adapted to interengage with the lifting bar of the load and adapted to assume the following positions:

- a transport position in which a front section is disposed at the front end of the equipment and oriented vertically or substantially vertically with the hook at the top and a longitudinal section is disposed to the rear of the front section and oriented horizontally or substantially horizontally with the front end of the longitudinal section connected to the base of the front section;
- a putting down on the ground or picking up position in which the hook is to the rear of the vehicle at a height enabling it to be interengaged with or released from the lifting bar of the load resting on the ground; and
- a tipping position to which the hook moves from the transport position by being pivoted upwardly and rearwardly by a tilting actuator about a transverse pivot axis situated to the rear of the equipment;

the handling arm including a bracket which has a first branch which forms the front section and a second branch which is part of the longitudinal section and a link which provides the remainder of the longitudinal section, the link being articulated at the front to the second branch of the bracket about a transverse intermediate pivot axis and articulated at the rear about the transverse rear pivot axis, in which equipment:

the means providing articulation of the link about the transverse rear pivot axis are adapted to be released and the means providing the articulation about the transverse intermediate pivot axis are adapted to be locked relative to the vehicle at the location they occupy in the transport position; and the equipment includes means for pivoting the link upward and forward about the transverse intermediate pivot axis after the means providing articulation of the link about the transverse rear pivot axis are released and the means providing the articulation about the transverse intermediate pivot axis are locked relative to the vehicle.

Pivoting the link in this way lifts the rear end of a load on the equipment, after which the front end of the load can be lifted by pivoting the bracket about the same axis by means of the tilting actuator, so that the equipment according to the invention can move the entire load into a position in which it is at a greater height than that it occupied in the transport position, especially when the load is provided with folding feet for supporting it at that height, as is the case with some dumpsters for agricultural use, for example, the bottom of which includes means for distributing the material contained in the dumpster to fill a tractor trailer placed under the dumpster.

Note that, thanks to the invention, no additional lever or link is needed to raise the rear of the load, the link of the handling arm being used for this purpose.

In accordance with preferred features, the equipment includes a frame adapted to be fixed to the chassis frame of the vehicle and to which the link is articulated about the transverse rear pivot axis.

The means providing the articulation about this axis, which are releasable, are therefore operative between the handling arm and the frame and can therefore be entirely assembled in the manufacturing plant, which offers the advantage that installing the equipment on the vehicle requires only fixing the frame of the equipment to the chassis frame.

Preferably, for reasons of simplicity and convenience of implementation:

the means for pivoting the link include a lifting actuator articulated at one end to the link and at its other end to the frame, and where applicable:

the lifting actuator is articulated to the frame at the front and to the link at the rear.

According to other preferred features the link includes two rollers adapted to support respective longitudinal rails on a righthand side and a lefthand side of a bottom face of the load.

Because these rollers are part of the link, they also pivot about the transverse intermediate pivot axis when lifting the rear of a load.

This offers the advantage, compared to the solution in which the rollers are part of the frame, or more generally fixed, that there is no need for a member for supporting the rear of the load to take over when the link pivots about the transverse intermediate pivot axis.

The transverse rear pivot axis and the transverse axis about which the rollers are articulated are preferably spaced from each other.

The vicinity of the transverse rear pivot axis can therefore remain relatively unimpeded, which simplifies the design of the releasable articulation means.

In a first preferred embodiment the link is entirely part of the longitudinal section with the transverse articulation axis of the rollers which, in the transport position, is situated just in front of the transverse rear pivot axis.

In a second preferred embodiment the link has an angle-iron profile with a first branch that is part of the longitudinal section and a second branch that is articulated at its base to the transverse rear pivot axis and the articulation axis of the rollers is situated at the junction between the first and second branches of the link.

A second aspect of the invention provides a vehicle including equipment as described above.

A third aspect of the invention provides a method of lifting with such a vehicle a load provided with a lifting bar on a front face and with four folding feet, in order to place the load on the feet in a deployed state, a bottom face of the load being then at a greater height than in the transport position, the method including:

a) moving from the transport position to a start or end of tilting position;

b) pivoting the link upward and forward about the transverse intermediate pivot axis;

c) deploying rear feet of the load;

d) pivoting the bracket upward and rearward about the transverse intermediate pivot axis; and e) deploying front feet of the load.

The disclosure of the invention now continues with the description of one embodiment, which is given hereinafter by way of illustrative and non-limiting example, and with reference to the accompanying drawings.

DETAILED DESCRIPTION OF THE PREFERRED EMBODIMENTS

Figure 1:
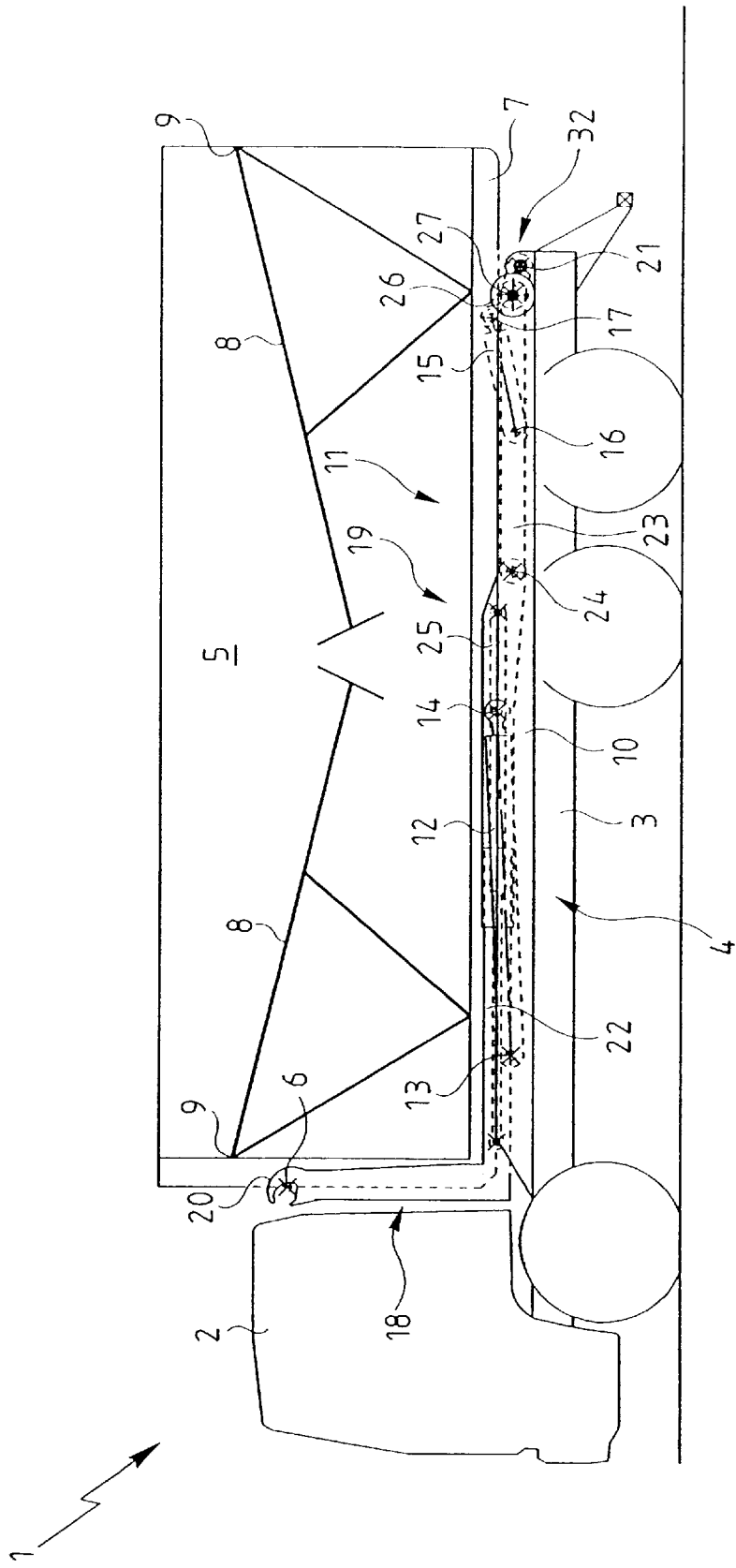
FIG. 1 is an elevation view from the lefthand side of a vehicle equipped with equipment according to the invention in a position for transporting a dumpster that has four folding feet.

The truck 1 shown in FIGS. 1 to 7 includes, behind a cab 2, a load-bearing chassis frame 3 on which is mounted equipment 4 according to the invention for manipulating a load such as a dumpster 5, which is provided in a manner that is well known in the art (for example as specified in the French AFNOR standard NF R 17-108 and the German DIN standard 30722) with a lifting bar 6 on its front face and two longitudinal rails 7 on the righthand and lefthand sides of its lower surface.

Figure 5:
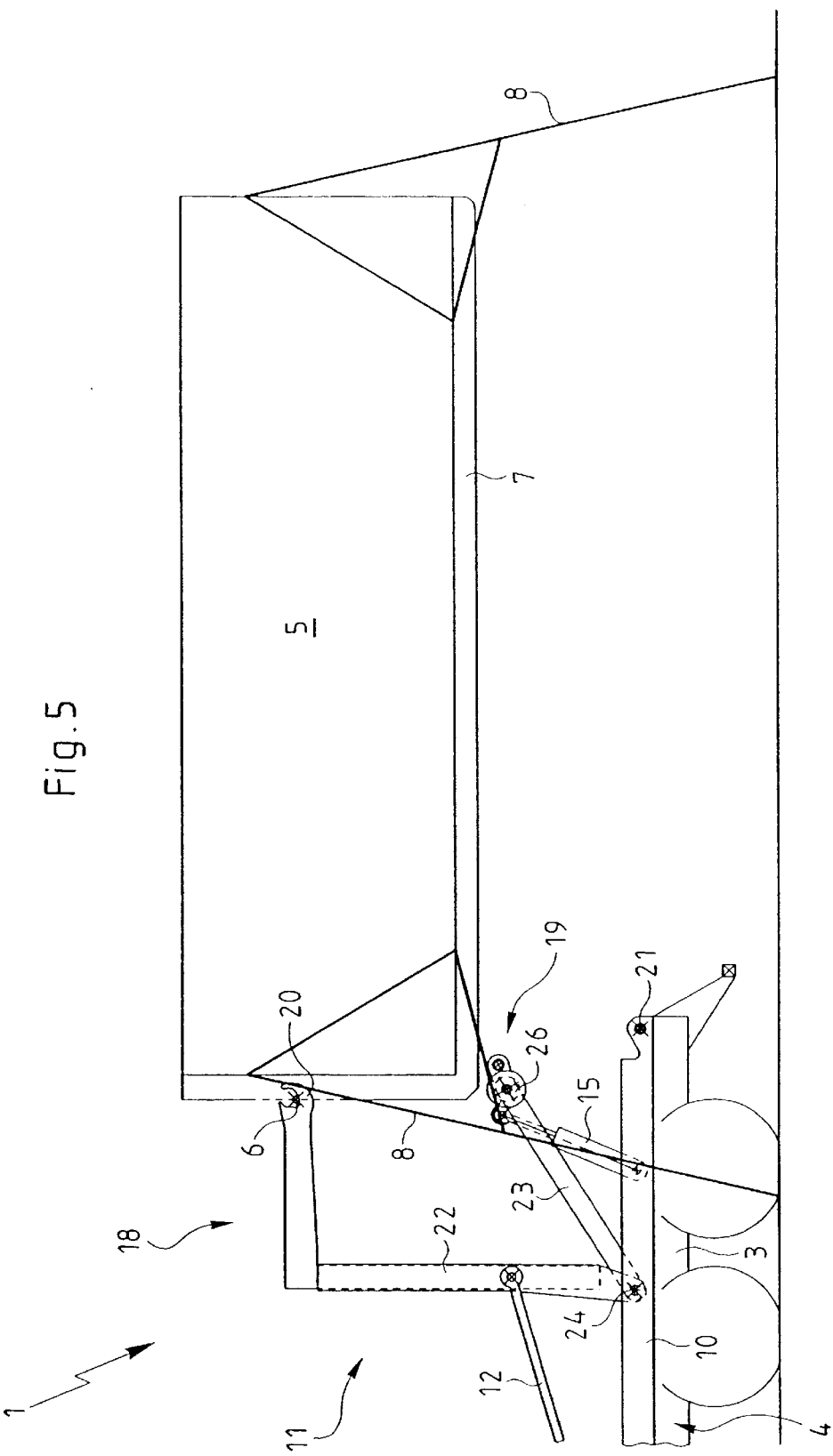
Figure 6:
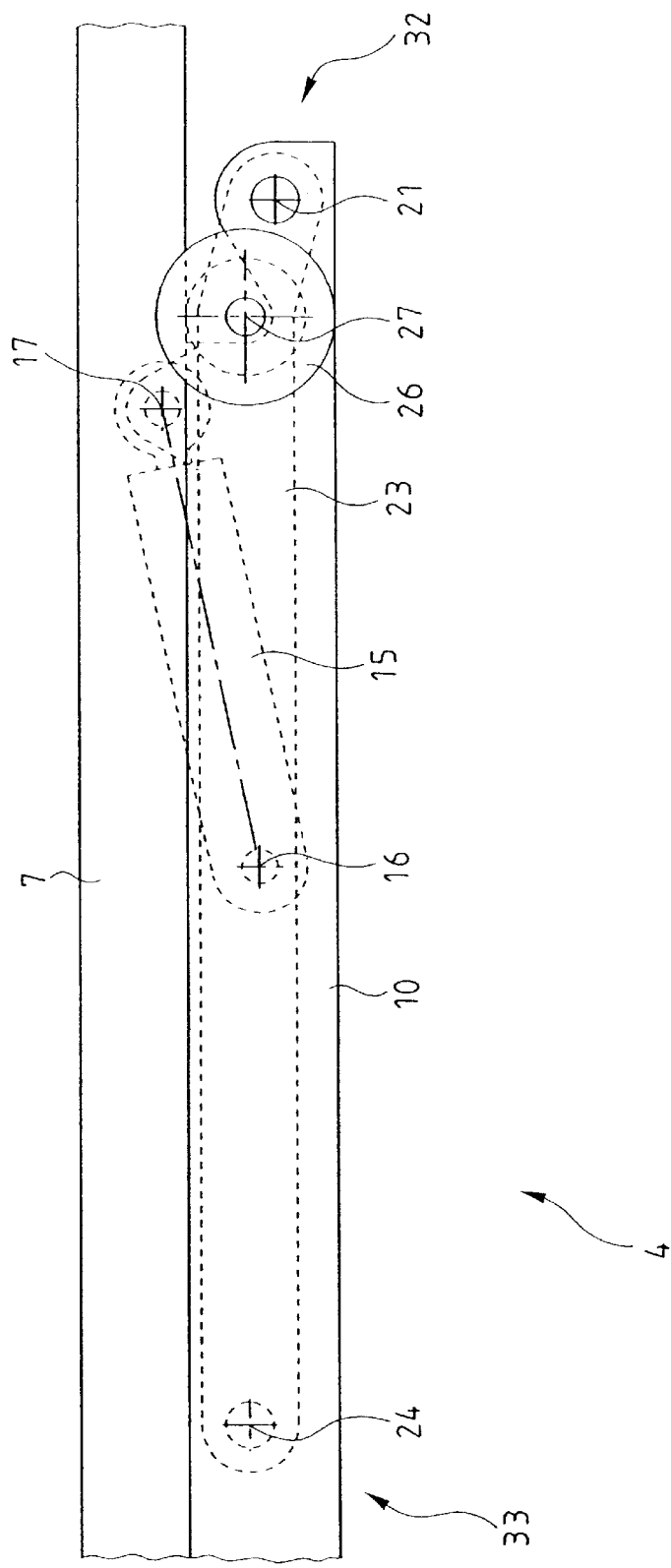
FIG. 6 is a view similar to FIG. 1 but showing, to a larger scale, only a rear portion of the equipment and rails on the lower face of the dumpster.

The dumpster 5 is also provided with four folding feet 8 respectively located front left, front right, rear left and rear right, each of the feet 8 being articulated about a transverse pivot axis 9 enabling it to move from the folded position shown in FIG. 1, in which it lies wholly against one of the lateral faces of the dumpster 5, to the deployed position shown in FIG. 5, with the bottom of the dumpster at a relatively great height above the ground, here approximately twice the height of the bottom of the dumpster in the transport position (FIG. 1).

The equipment 4 includes a frame 10 fixed to the chassis frame 3, a handling arm 11 mounted on the frame 10, a tilting actuator 12 whose front end is articulated to the frame 10 about a transverse pivot axis 13 and whose rear end is articulated to the arm 11 about a transverse articulation axis 14, and a lifting actuator 15 whose front end is articulated to the frame 10 about a transverse articulation axis 16 and whose rear end is articulated to the arm 11 about a transverse articulation axis 17.

The handling arm 11 has a front section 18 and a longitudinal section 19.

In the transport position (FIG. 1) the front section 18 is disposed at the front end of the equipment 4 and is oriented vertically or substantially vertically with a hook 20 adapted to interengage with the lifting bar 6 of the dumpster 5 at the top. In this position, the longitudinal section 19 is disposed to the rear of the front section 18 and oriented horizontally or substantially horizontally with its front end connected to the bottom of the section 18 and its rear end articulated about a rear pivot axis 21 relative to the frame 10.

Here the handling arm 11 is formed of a bracket 22 and a link 23.

The bracket 22 has two branches, one of which forms the front section 18 and the other of which is part of the longitudinal section 19, this second branch being articulated to the front end of the link 23 about a transverse pivot axis 24 opposite the front section 18. The articulation axis 14 between the actuator 12 and the longitudinal section 19 of the arm 11 is on this second branch, not far from the axis 24.

The second branch of the bracket 22 is telescopic: it has a deployed position in which its length is a maximum (FIG. 1) and a retracted position in which its length is a minimum (FIGS. 2 to 5). An arm actuator 25, part of which can be seen in FIGS. 1 and 2, moves the second branch of the bracket 22 from the deployed position to the retracted position and vice versa.

The link 23 has a rectilinear profile. It is articulated at its front end to the bracket 22 about the axis 24 and at its rear end to the frame 10 about the axis 21. The longitudinal section 19 of the arm 11 is therefore formed by the link 23 and by the second branch of the bracket 22.

Figure 7:
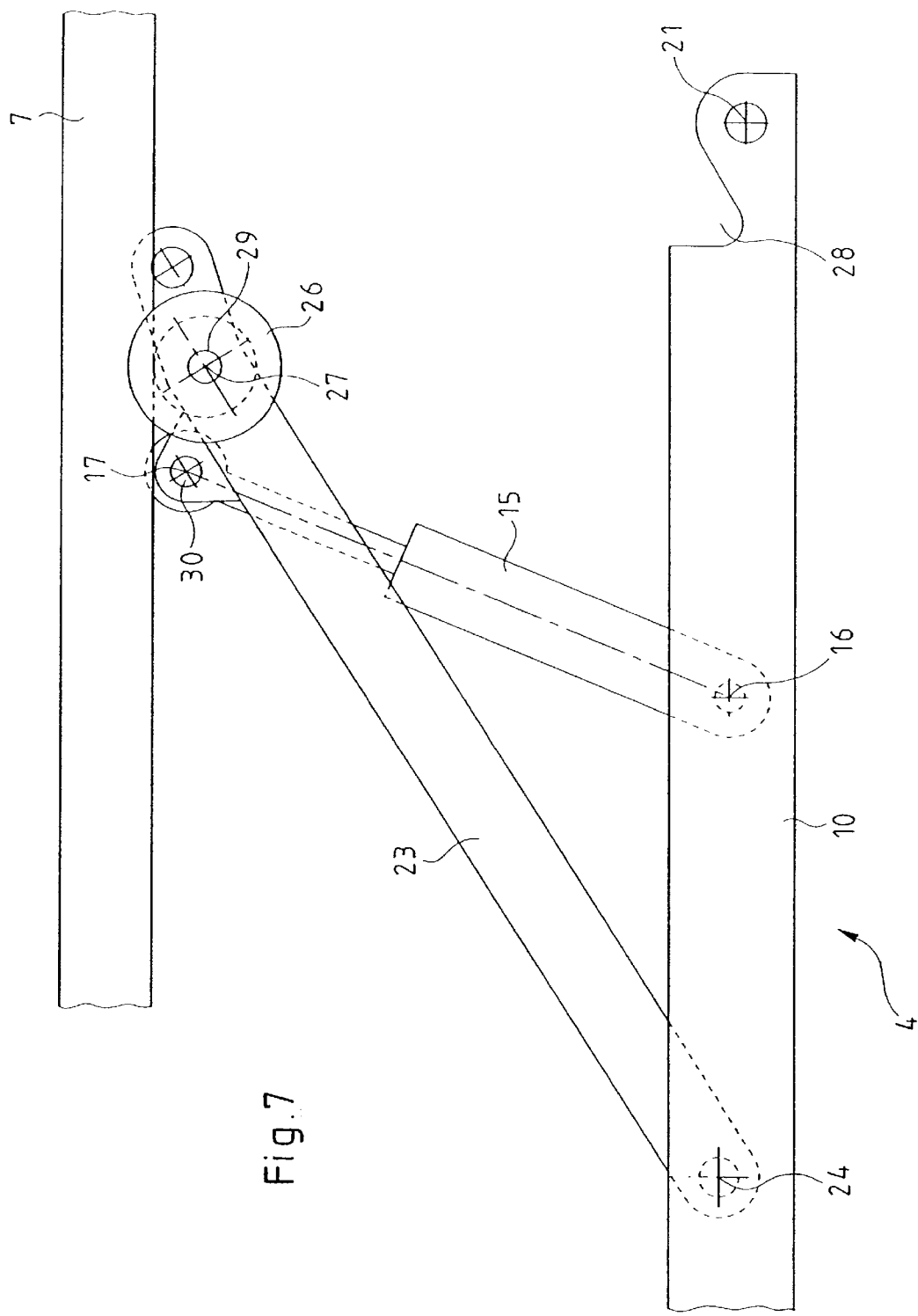
FIG. 7 shows the same portion of the equipment as FIG. 6, but in a position similar to that of FIG. 3.

As can be better seen in FIG. 7, the link 23 includes two rollers 26 for supporting respective rails 7 of the dumpster 5, the rollers 26 being mounted to rotate about a transverse articulation axis 27 which, in the transport position, is situated just in front of the axis 21.

The link 23 is disposed between two side members of the frame 10, each roller 26 being disposed on the outside of the side member that is on the same side as itself, the side members each having a notch 28 for accommodating a bar 29 extending from the link 23 to the roller 26 and serving as an articulation journal for the latter.

Like the frame 10, the link 23 is formed of two side members between which extend cross members, in particular a cross member 30 to which the end of the rod of the actuator 15 is articulated about the axis 17. Note that in the transport position this latter axis is just in front of and above the axis 27.

The end of the body of the actuator 15 is articulated about the axis 16 to a cross member disposed between the side members of the frame 10.

The articulation means 32 between the link 23 and the frame 10 about the axis 21, instead of being permanent like the other articulation means, are releasable, and the articulation means 33 between the bracket 22 and the link 23 about the axis 24 are adapted to be immobilized relative to the frame 10.

Figure 8:
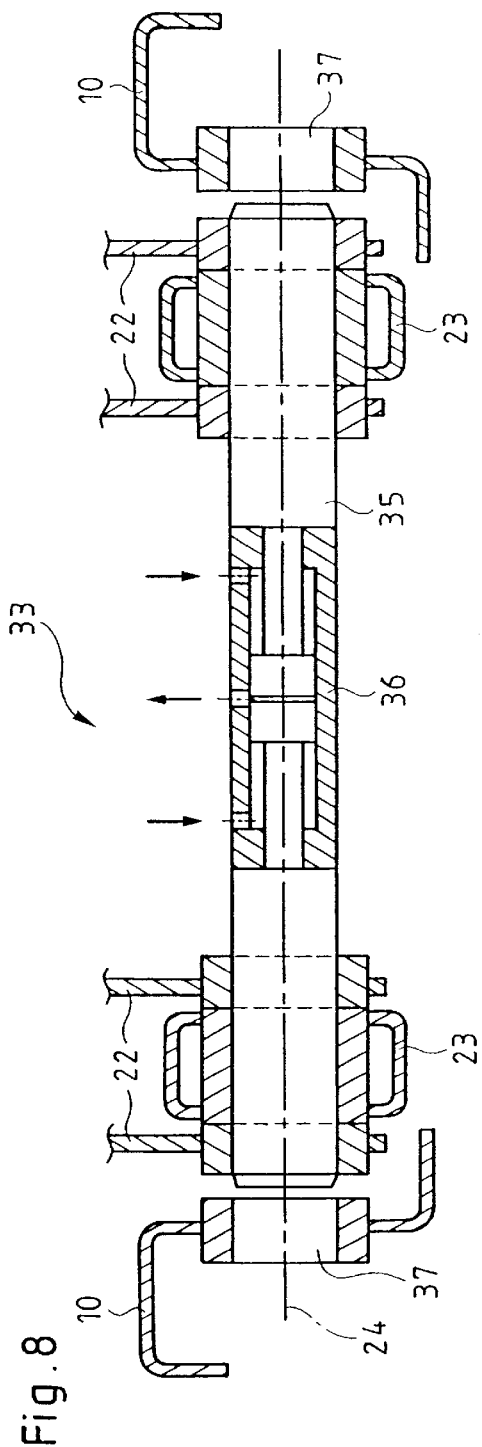
FIG. 8 is a view of the equipment in elevation and in cross section in the plane of the articulation axis between the bracket and the link.

As can be seen in FIG. 8, the articulation means 33 include a transverse bar 35 serving as an articulation journal for the two side members of the link 23 and for the two yokes of the bracket 22, each of the side members 23 being disposed at the center of one of these yokes.

The bar 35 has at its center a double actuator 36 having a common body and two rods respectively connected to the portion of the bar 35 to the left of the actuator 36 and to the right of the actuator 36. In the position shown in FIG. 8, which corresponds to the transport position of the equipment (FIG. 1), the two rods of the actuator 36 are retracted so that the bar 35 has a minimum length. In the transport position, the bracket 22 and the link 33 rest on abutments on the frame 10, not shown, and are positioned relative to the latter so that each of the ends of the bar 35 faces a hole 37 formed coaxially with the bar 35 in each side member of the frame 10.

Figure 9:
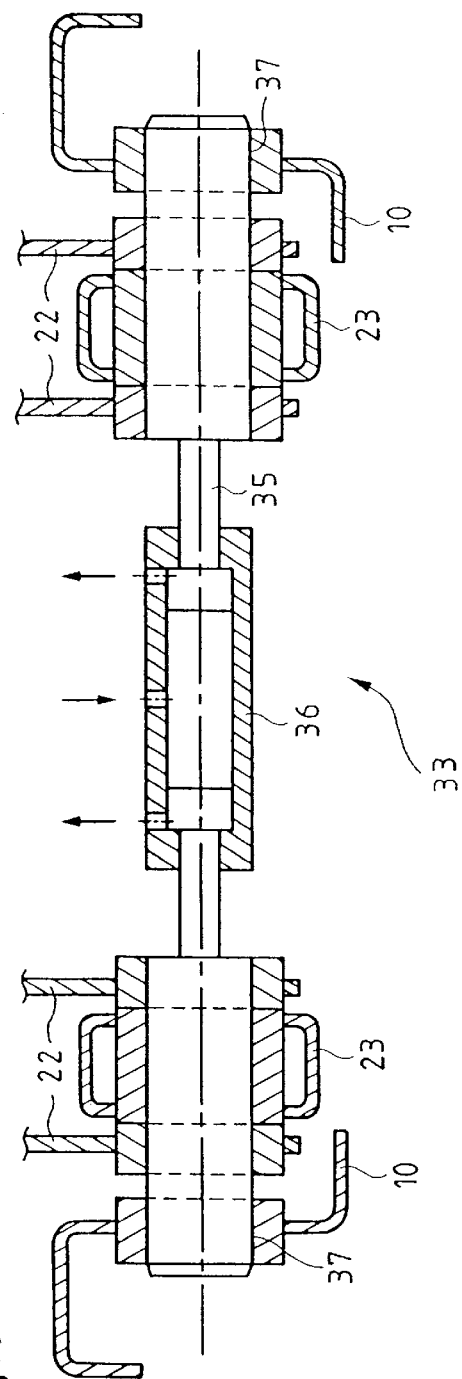
FIG. 9 is a view similar to FIG. 8 but with the articulation means between the bracket and the link locked to the frame of the equipment.

When the rods of the actuator 36 are in the deployed position, i.e. when the length of the bar 35 is the maximum length, each of the end portions of the bar is engaged in a respective hole 37, as shown in FIG. 9.

It can be seen that, in the position shown in FIG. 8, the articulation means 33 between the bracket 22 and the link 23 are free to move relative to the frame 10 whereas, in the position shown in FIG. 9, the articulation means 33 are locked with respect to the frame 10.

Of course, in each of the positions shown in FIGS. 8 and 9, the bracket 22 and the link 23 can pivot relative to each other about the axis 24.

The articulation means 32 between the frame 10 and the link 23 are similarly constructed, the side members of the link 23 each being articulated to a bar similar to the bar 35. The articulation means 32 are active when the bar is in the deployed position (rods deployed from the body of the central actuator) and released when the bar is in the retracted position (rods retracted into the body of the central actuator).

Each respective central actuator of the bar 35 and the corresponding bar of the articulation means 32 is operated hydraulically and each bar cooperates with a position sensor connected to safety means adapted to prohibit any maneuver involving pivoting about the axis 21 or about the axis 24 if either of the articulation means 32 or 33 is not in the locked or released position required for the maneuver to be carried out.

Figure 4:
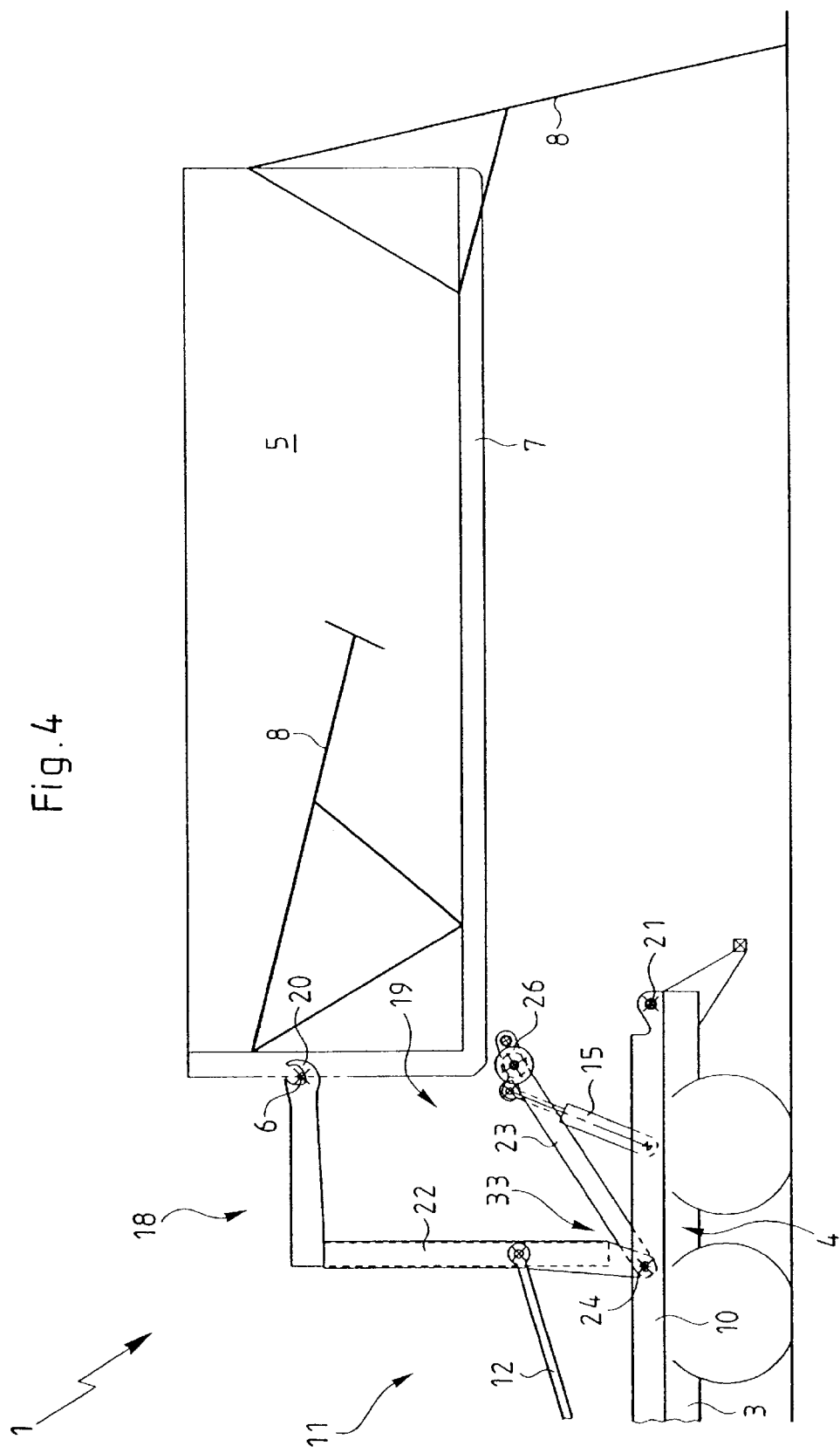
Figure 11:
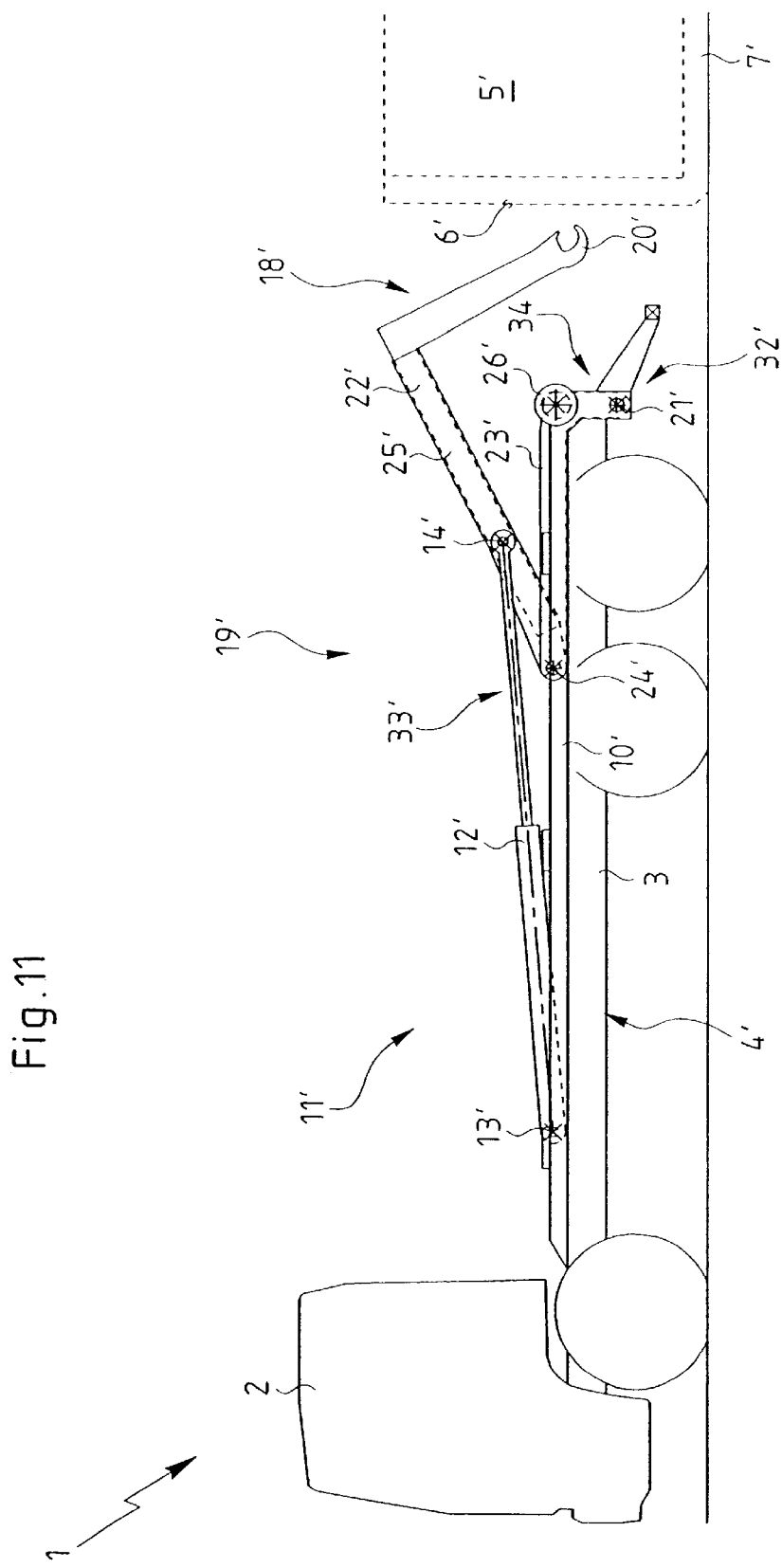
FIGS. 11 and 12 show in a similar fashion to FIGS. 1 to 5 a vehicle equipped with this embodiment of the equipment, respectively in a position for putting the dumpster down on the ground or picking it up and in a position for tipping the dumpster.

When the articulation means 33 are immobilized relative to the frame 10, the actuator 12 can pivot the bracket 22 upwardly and rearwardly relative to the frame 10 about the axis 24, as shown in FIGS. 4, 5 and 11. What is more, when the articulation means 32 are then released from the frame 10, operation of the actuator 15 pivots the link 23 upward and forward about the axis 24 until it reaches the position shown in FIGS. 3 and 5 and 7 for lifting the rear of a load.

Figure 10:
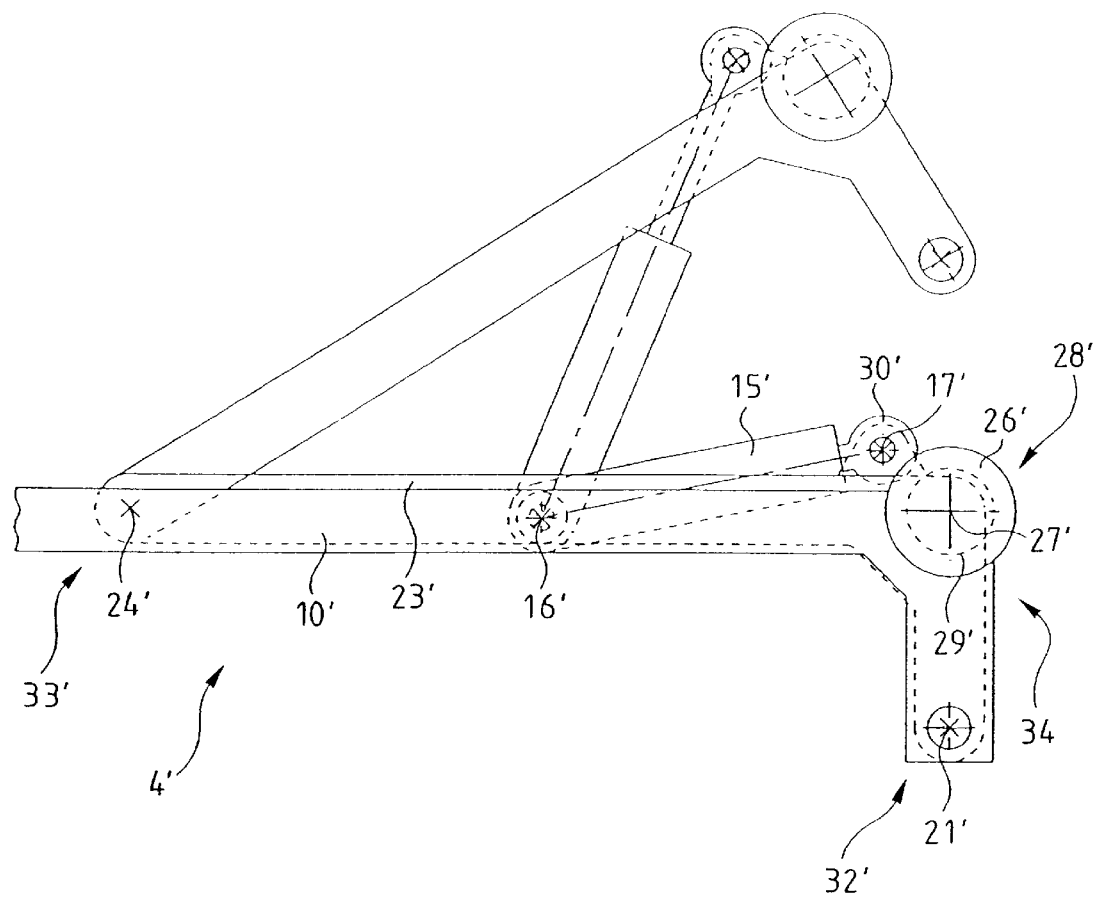
FIG. 10 shows in a similar fashion to FIGS. 6 and 7 an embodiment in which the link of the handling arm has an angle-iron profile.
Figure 12:
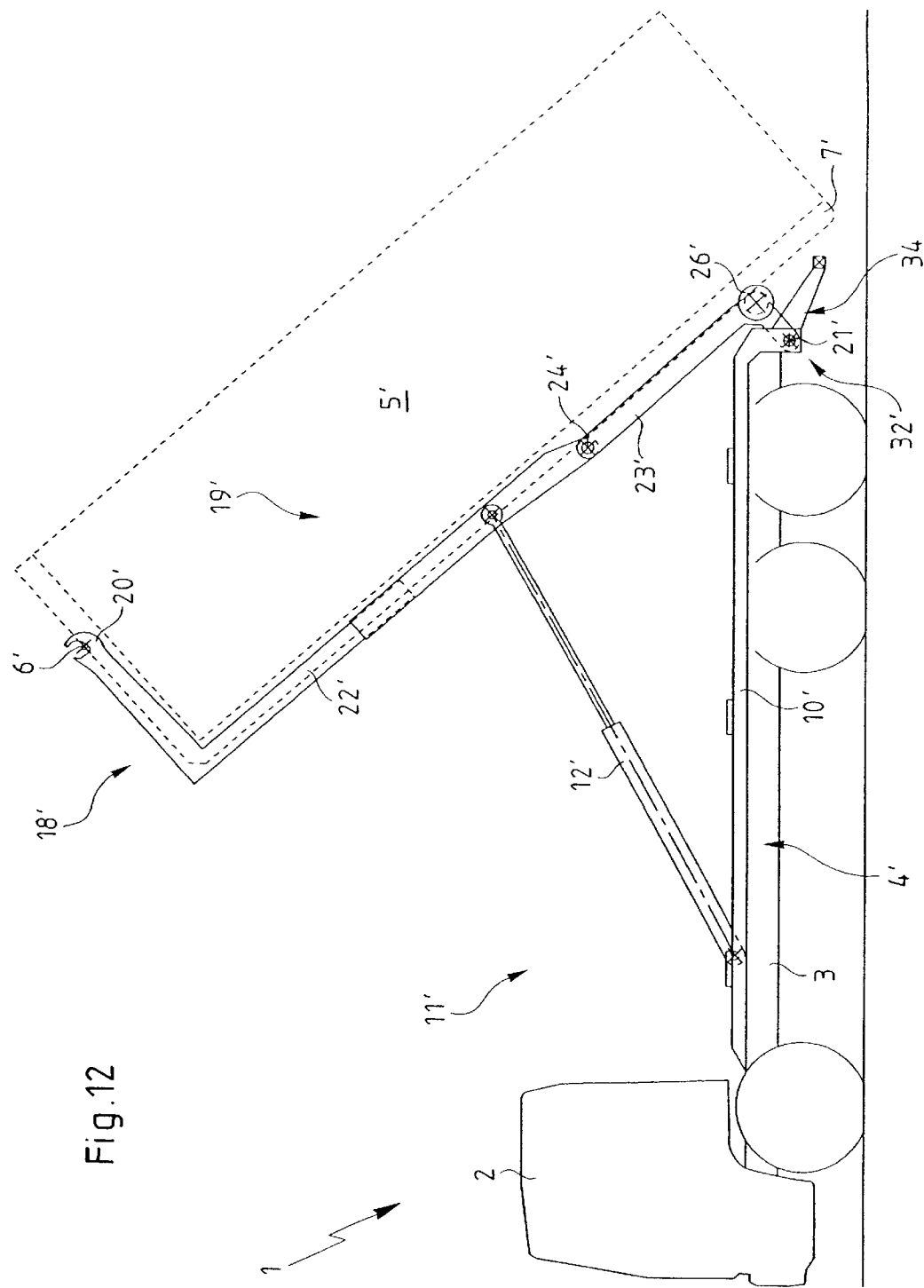

FIGS. 10 to 12 show an embodiment 4' of the equipment 4 for which the same reference numbers are generally retained, but "primed" (').

The profile of the link 23' is not rectilinear, but angle-iron-shaped, with a first branch that is part of the longitudinal section 19' of the handling arm 11' and a second branch which is articulated at its base around the transverse rear pivot axis 21', the second branch forming a rear section 34 of the handling arm 11' which, in the transport position, is disposed to the rear of the longitudinal section 19' and oriented vertically or substantially vertically. The frame 10' consequently has an L-shaped profile whose first branch is on the chassis frame 3 of the vehicle 1, like the frame 10, and whose second branch projects downward from the first branch and is just to the rear of the side members of the chassis frame 3.

Note that, to simplify the drawings, the actuator 15' is not shown in FIGS. 11 and 12 and that the load 5' shown in these figures is a conventional dumpster with no feet 8.

How the equipment 4 and 4' operate is explained next.

When it is required to place the dumpster 5 or 5' on the ground, starting from the transport position shown in FIG. 1, the actuator 25 or 25' is operated to move the second branch of the bracket 18 or 18' from its deployed position to its retracted position, which moves the load 5 or 5' relative to the vehicle 1.

Figure 2:
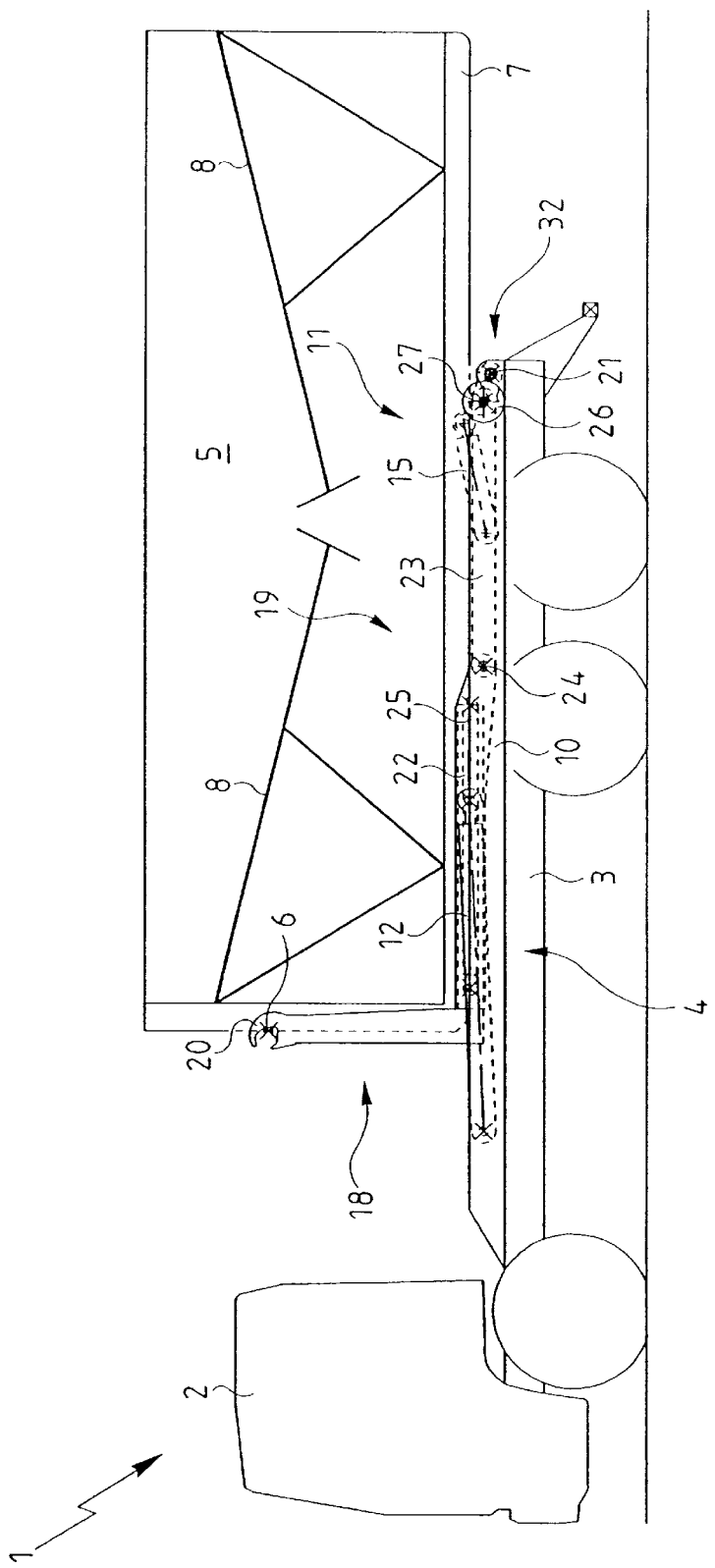
FIGS. 2 to 5 are similar views but show the equipment in successive positions it assumes when the dumpster is set on its feet, the length of the feet being such that the dumpster is then at a height greater than when it is in the transport position.
Figure 3:
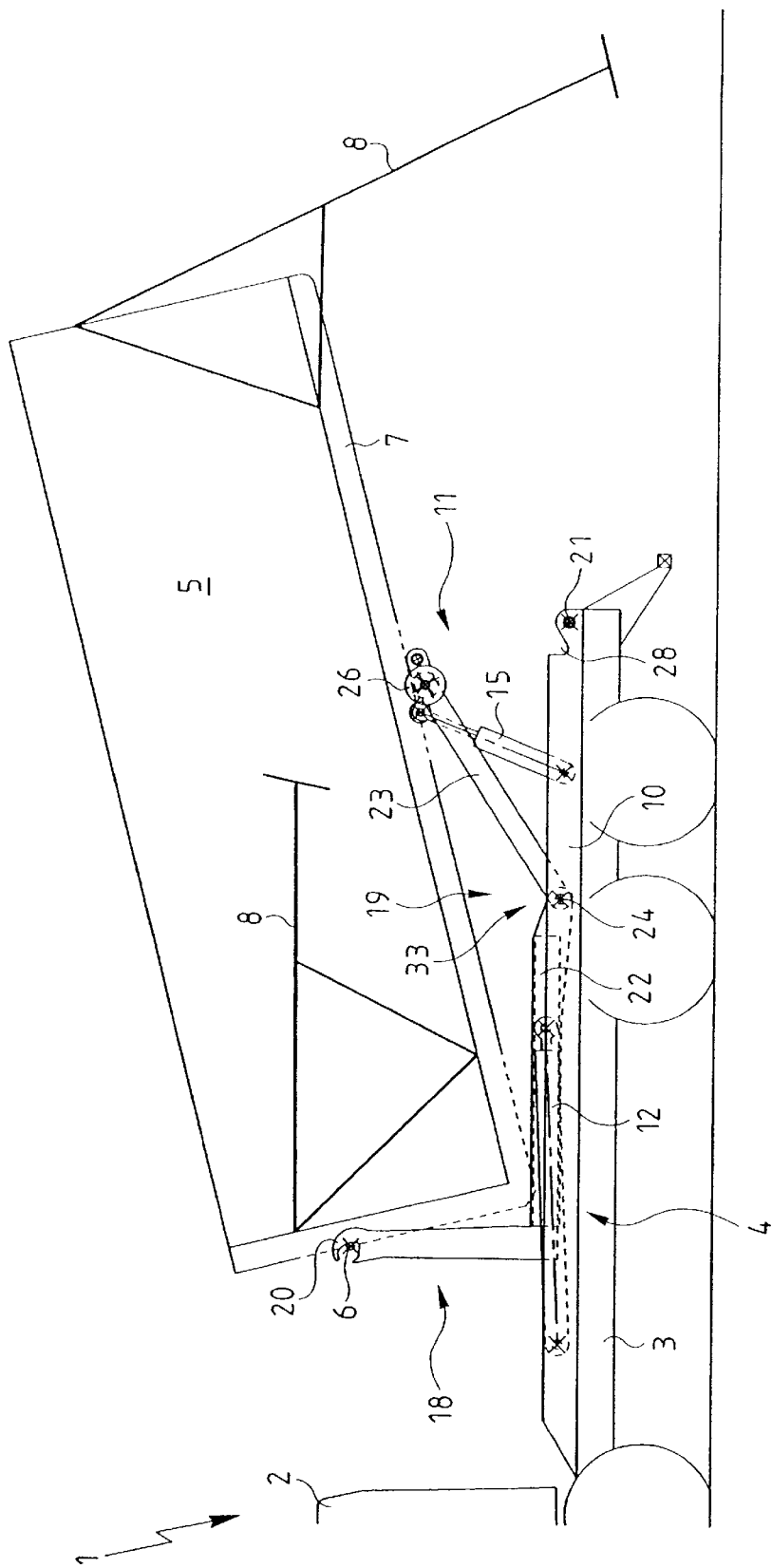

When the second branch of the bracket 18 or 18' is retracted, the load 5 or 5' is in the start of tilting position shown in FIG. 2. In this position, the articulation means 33 or 33' are locked to the frame 10 or 10', so that the articulation axis 24 or 24' remains fixed with respect to the frame. The bracket 18 or 18' is therefore free to pivot about the axis 24 or 24'.

The maneuver to place the load 5 or 5' on the ground continues with operation of the tilting actuator 12 or 12' to pivot the bracket 22 to 22' about the axis 24 or 24', until it reaches the putting down on the ground position shown in FIG. 11. During the movement from the start of tilting position (FIG. 2) to the putting down on the ground position (FIG. 11), the load 5 or 5' tilts upward and rearward as it pivots about the articulation axis 27 or 27' of the rollers 26 or 26', until the edge of the load 5 or 5' between its bottom face and its rear face meets the ground, the dumpster then being progressively lowered until the whole of its bottom face rests on the ground, so that the hook 20 or 20' can disengage from the bar 6 or 6'.

To pick up a dumpster on the ground, exactly the same maneuvers are performed, but in the reverse order: the actuator 12 or 12' is operated to engage the hook 20 or 20' in the bar 6 or 6' and then to raise the front of the load 5 or 5' at the same time as moving the load forward relative to the vehicle 1 (preferably by reversing the vehicle toward the load, the latter remaining fixed with respect to the ground), until the rails 7 or 7' come into contact with the rollers 23 or 23', from which point the dumpster 5 or 5' levels up while continuing to move forward relative to the vehicle 1, as far as the end of tilting position (FIG. 2), at which point the actuator 25 or 25' is operated to move it to the transport position (FIG. 1).

In the transport position, the articulation means 33 or 33' are released from the frame 10 or 10' and the bracket 22 or 22' is locked to the link 23 or 23' by means that are known in the art, so that these two members cannot pivot relative to each other about the axis 24 or 24', but form a rigid assembly.

To move from the transport position (FIG. 1) to the tipping position (FIG. 12), the actuator 12 or 12' is operated to pivot the arm 11 or 11' and in particular the hook 20 or 20' and consequently the load 5 or 5' about the axis 21 or 21'. Because it is tilted, the load 5 or 5' can then be tipped behind the vehicle 1, after opening its rear door(s).

Between times at which it must be operated, the actuator 15 or 15' is passive, i.e. its rod is free to move relative to its body, thanks to a double-acting distributor whose rest position establishes communication between the two chambers of the actuator. This in particular enables the equipment 4 or 4' to move from the transport position (FIG. 1) to the tipping position (FIG. 12).

When it is required to place on its feet a load such as the dumpster 5, starting from the transport position shown in FIG. 1, the actuator 25 or 25' is operated to move the second branch of the bracket 22 or 22' from its deployed position to its retracted position, which moves the dumpster 5 toward the rear relative to the vehicle 1.

When the second branch of the bracket 22 or 22' is in the retracted position, the position is the start or end of tilting position shown in FIG. 2, in which the articulation means 33 or 33' are immobilized relative to the frame 10 or 10', but instead of then operating the actuator 12 or 12', the articulation means 32 or 32' are released and the actuator 15 or 15' is operated, so that the link 23 or 23' pivots upward and forward about the axis 24 or 24', which raises the rear of the dumpster 5, which is then supported at the front by the hook 20 or 20' and in the middle by the rollers 26 or 26'. The rear end of the dumpster 5 is then raised sufficiently to deploy the rear feet 8. At this stage the configuration is that shown in FIG. 3.

The actuator 12 or 12' is then operated, which pivots the bracket 22 or 22' upward and rearward about the axis 24 or 24', so that the front of the dumpster 5 is raised at the same time as the dumpster is moved backward relative to the vehicle, the rear feet 8 encountering the ground during this movement, which continues as far as the position shown in FIG. 4, in which the dumpster 5 is disposed horizontally or substantially horizontally with its bottom no longer in contact with the rollers 26 or 26'.

The front feet 8 are then deployed, after which the actuator 12 or 12' is operated again so that the feet 8 come into contact with the ground (in the position shown in FIG. 5) and the hook 20 or 20' then disengages from the bar 6.

To load the dumpster 5 resting on its feet 8 onto the vehicle 1, the same maneuvers are performed but in the reverse direction.

In embodiments that are not shown, the telescopic bracket 22 or 22' is replaced by another type of telescopic or non-telescopic bracket, in particular of the type described in U.S. Pat. No. 3,878,948 or in patent application FR 2 169 810 A.

Other embodiments that are not shown include two tilting actuators disposed side by side (rather than only one) and the vehicle, rather than being a truck with a load-bearing chassis frame, is a semi-trailer.

Many other embodiments can be envisaged according to individual circumstances, and at this point it is as well to bear in mind that the invention is not limited to the examples described and shown.

There is claimed:

1. Equipment enabling a vehicle to put down on the ground or to pick up a load and to tip said load, which has a lifting bar on a front face, said equipment including a deformable and tilting handling arm provided at one end with a hook adapted to interengage with said lifting bar of said load and adapted to assume the following positions:

a transport position in which a front section is disposed at the front end of said equipment and oriented vertically or substantially vertically with said hook at the top and a longitudinal section is disposed to the rear of said front section and oriented horizontally or substantially horizontally with the front end of said longitudinal section connected to a base of said front section;

a putting down on the ground or picking up position in which said hook is to the rear of said vehicle at a height enabling it to be interengaged with or released from said lifting bar of said load resting on the ground; and a tipping position to which said hook moves from said transport position by being pivoted upwardly and rearwardly by a tilting actuator about a transverse pivot axis situated to the rear of said equipment;

said handling arm including a bracket which has a first branch which forms said front section and a second branch which is part of said longitudinal section and a link which provides the remainder of said longitudinal section, said link being articulated at the front to said second branch of said bracket about a transverse intermediate pivot axis and articulated at the rear about said transverse rear pivot axis, in which equipment:

means providing articulation of said link about said transverse rear pivot axis are adapted to be released and means providing said articulation about said transverse intermediate pivot axis are adapted to be locked relative to said vehicle at the location they occupy in said transport position; and said equipment includes means for pivoting said link upward and forward about said transverse intermediate pivot axis after said means providing articulation of said link about said transverse rear pivot axis are released and said means providing said articulation about said transverse intermediate pivot axis are locked relative to said vehicle.

2. The equipment claimed in claim 1 including a frame adapted to be fixed to a chassis frame of said vehicle and to which said link is articulated about said transverse rear pivot axis.

3. A vehicle including equipment as claimed claim 2.

4. A method of lifting with a vehicle as claimed in claim 3 a load provided with a lifting bar on a front face and with four folding feet, in order to place said load on said feet in a deployed state, a bottom face of said load being then at a greater height than in said transport position, said method including:
a) moving from said transport position to a start or end of a tilting position;
b) pivoting said link upward and forward about said transverse intermediate pivot axis;
c) deploying rear feet of said load;
d) pivoting said bracket upward and rearward about said transverse intermediate pivot axis; and
e) deploying front feet of said load.

5. The equipment claimed in claim 2 wherein said means for pivoting said link include a lifting actuator articulated at one end to said link and at its other end to said frame.

6. A vehicle including equipment as claimed claim 5.

7. A method of lifting with a vehicle as claimed in claim 6 a load provided with a lifting bar on a front face and with four folding feet, in order to place said load on said feet in a deployed state, a bottom face of said load being then at a greater height than in said transport position, said method including:
a) moving from said transport position to a start or end of a tilting position;
b) pivoting said link upward and forward about said transverse intermediate pivot axis;
c) deploying rear feet of said load;
d) pivoting said bracket upward and rearward about said transverse intermediate pivot axis; and
e) deploying front feet of said load.

8. The equipment claimed in claim 5 wherein said lifting actuator is articulated to said frame at the front and to said link at the rear.

9. A vehicle including equipment as claimed claim 8.

10. A method of lifting with a vehicle as claimed in claim 9 a load provided with a lifting bar on a front face and with four folding feet, in order to place said load on said feet in a deployed state, a bottom face of said load being then at a greater height than in said transport position, said method including:
a) moving from said transport position to a start or end of a tilting position;
b) pivoting said link upward and forward about said transverse intermediate pivot axis;
c) deploying rear feet of said load;
d) pivoting said bracket upward and rearward about said transverse intermediate pivot axis; and
e) deploying front feet of said load.

11. The equipment claimed in claim 1 wherein said link includes two rollers adapted to support respective longitudinal rails on a righthand side and a lefthand side of a bottom face of said load.

12. The equipment claimed in claim 11 wherein said transverse rear pivot axis and said transverse axis about which said rollers are articulated are spaced from each other.

13. The equipment claimed in claim 12 wherein said link is entirely part of said longitudinal section with said transverse articulation axis of said rollers which, in said transport position, is situated just in front of said transverse rear pivot axis.

14. The equipment claimed in claim 12 wherein said link has an angle-iron profile with a first branch that is part of said longitudinal section and a second branch that is articulated at its base to said transverse rear pivot axis and said articulation axis of said rollers is situated at the junction between said first and second branches of said link.

15. The equipment claimed in claim 11 wherein said link is disposed between two side members of a frame of said equipment, each roller is disposed farther toward the outside than the corresponding side member, and each side member of said frame includes a notch to accommodate a bar extending from said link of the corresponding roller.

16. The equipment claimed in claim 11 wherein a lifting actuator is articulated to said link at a location which, in said transport position, is just in front of and above said articulation axis of said rollers.

17. A vehicle including equipment as claimed claim 11.

18. A method of lifting with a vehicle as claimed in claim 17 a load provided with a lifting bar on a front face and with four folding feet, in order to place said load on said feet in a deployed state, a bottom face of said load being then at a greater height than in said transport position, said method including:
a) moving from said transport position to a start or end of a tilting position;
b) pivoting said link upward and forward about said transverse intermediate pivot axis;
c) deploying rear feet of said load;
d) pivoting said bracket upward and rearward about said transverse intermediate pivot axis; and
e) deploying front feet of said load.

19. A vehicle including equipment as claimed claim 1.

20. A method of lifting with a vehicle as claimed in claim 19 a load provided with a lifting bar on a front face and with four folding feet, in order to place said load on said feet in a deployed state, a bottom face of said load being then at a greater height than in said transport position, said method including:
a) moving from said transport position to a start or end of a tilting position;
b) pivoting said link upward and forward about said transverse intermediate pivot axis;
c) deploying rear feet of said load;
d) pivoting said bracket upward and rearward about said transverse intermediate pivot axis; and
e) deploying front feet of said load.

* * * * *